US011953848B2

(12) United States Patent
Kainuma et al.

(10) Patent No.: US 11,953,848 B2
(45) Date of Patent: Apr. 9, 2024

(54) BELT UNIT AND METHOD FOR ASSEMBLING BELT UNIT

(71) Applicant: KYOCERA Document Solutions Inc., Osaka (JP)

(72) Inventors: Takashi Kainuma, Osaka (JP); Kazuhisa Hirahara, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/169,049

(22) Filed: Feb. 14, 2023

(65) Prior Publication Data

US 2023/0259055 A1 Aug. 17, 2023

(30) Foreign Application Priority Data

Feb. 17, 2022 (JP) ................................ 2022-022746

(51) Int. Cl.

| | |
|---|---|
| ***G03G 15/00*** | (2006.01) |
| ***G03G 15/16*** | (2006.01) |
| *G03G 21/18* | (2006.01) |

(52) U.S. Cl.

CPC ....... *G03G 15/162* (2013.01); *G03G 15/1615* (2013.01); *G03G 21/1864* (2013.01); *G03G 2215/0869* (2013.01)

(58) Field of Classification Search

CPC ............. G03G 15/1615; G03G 15/162; G03G 15/757; G03G 21/1857; G03G 21/186; G03G 21/1864; G03G 2215/0869

See application file for complete search history.

(56) References Cited

U.S. PATENT DOCUMENTS

| | | | | |
|---|---|---|---|---|
| 2009/0214274 A1* | 8/2009 | Maeda | ............... | G03G 15/1685 474/101 |
| 2012/0114371 A1* | 5/2012 | Furuya | ................. | G03G 15/161 399/101 |
| 2019/0369530 A1* | 12/2019 | Kubota | ............. | G03G 15/0808 |

FOREIGN PATENT DOCUMENTS

| | | |
|---|---|---|
| JP | 2002-040753 A | 2/2002 |

* cited by examiner

*Primary Examiner* — Hoang X Ngo
(74) *Attorney, Agent, or Firm* — Stein IP, LLC

(57) ABSTRACT

A belt unit includes a belt that is endless, a plurality of stretching rollers, a pair of side frames and one or more shafts. The side frames are each provided with bearing holes that rotatably support opposite end parts of the stretching rollers, and positioning holes into which opposite end parts of the shafts are inserted. The shafts each have formed therein a first engagement groove that engages with a first holding jig. The stretching rollers each have formed therein a second engagement groove that engages with a second holding jig. When the first engagement groove is in engagement with the first holding jig, the shafts are arranged opposite the positioning holes corresponding thereto, and have a phase thereof restricted in a circumferential direction thereof. When the second engagement groove is in engagement with the second holding jig, the stretching rollers are arranged opposite the bearing holes corresponding thereto.

9 Claims, 7 Drawing Sheets

BELT UNIT AND METHOD FOR ASSEMBLING BELT UNIT

INCORPORATION BY REFERENCE

This application is based on and claims the benefit of priority from Japanese Patent Application No. 2022-022746 filed on Feb. 17, 2022, the contents of which are hereby incorporated by reference.

BACKGROUND

The present disclosure relates to a belt unit attached in a main body of an image forming apparatus and a method for assembling the belt unit.

Conventionally, there have been known image forming apparatuses adopting an intermediate transfer method that include an intermediate transfer belt that is endless and is caused to rotate in a predetermined direction and a plurality of image forming portions arranged along the intermediate transfer belt, and in which toner images are primarily transferred by the image forming portions sequentially onto the intermediate transfer belt to be superimposed one on another, and then are secondarily transferred onto a recording medium all at once.

In the image forming apparatuses adopting the intermediate transfer method as described above, it is necessary to regularly replace the intermediate transfer belt, of which service life is shorter than that of the apparatus main body. Thus, there has been widely used a structure in which an intermediate transfer unit including an intermediate transfer belt is configured to be attachable and detachable with respect to a main body of an image forming apparatus. An intermediate transfer unit has an intermediate transfer belt stretched between a plurality of rollers supported by a pair of side frames, one of the rollers functioning as a tension roller that is outwardly biased by biasing means to thereby apply a predetermined tension force to the belt.

Inconveniently, however, such an intermediate transfer unit suffers a problem of poor workability in assembling the plurality of rollers to the frames.

SUMMARY

According to one aspect of the present disclosure, a belt unit includes a belt that is endless, a plurality of stretching rollers, a pair of side frames, and one or more shafts, and the belt unit is attachable and detachable with respect to a main body of an image forming apparatus. The stretching rollers are arranged in contact with an inner circumferential surface of the belt. The pair of side frames rotatably support opposite end parts of the stretching rollers in an axial direction thereof. The shafts have opposite end parts thereof in an axial direction thereof supported by the side frames so as not to be rotatable. The side frames are each provided with bearing holes that rotatably support the opposite end parts of the plurality of stretching rollers, and positioning holes into which the opposite end parts of the shafts are inserted. The shafts each have formed therein a first engagement groove that engages with a first holding jig that horizontally holds that shaft during assembly of the belt unit. The stretching rollers have formed therein a second engagement groove that engages with a second holding jig that horizontally holds the stretching rollers during the assembly of the belt unit. When the first engagement groove is in engagement with the first holding jig, the shafts are arranged opposite the positioning holes corresponding thereto, and have a phase thereof restricted in a circumferential direction thereof, and when the second engagement groove is in engagement with the second holding jig, the stretching rollers are arranged opposite the bearing holes corresponding thereto.

DETAILED DESCRIPTION

Figure 1:
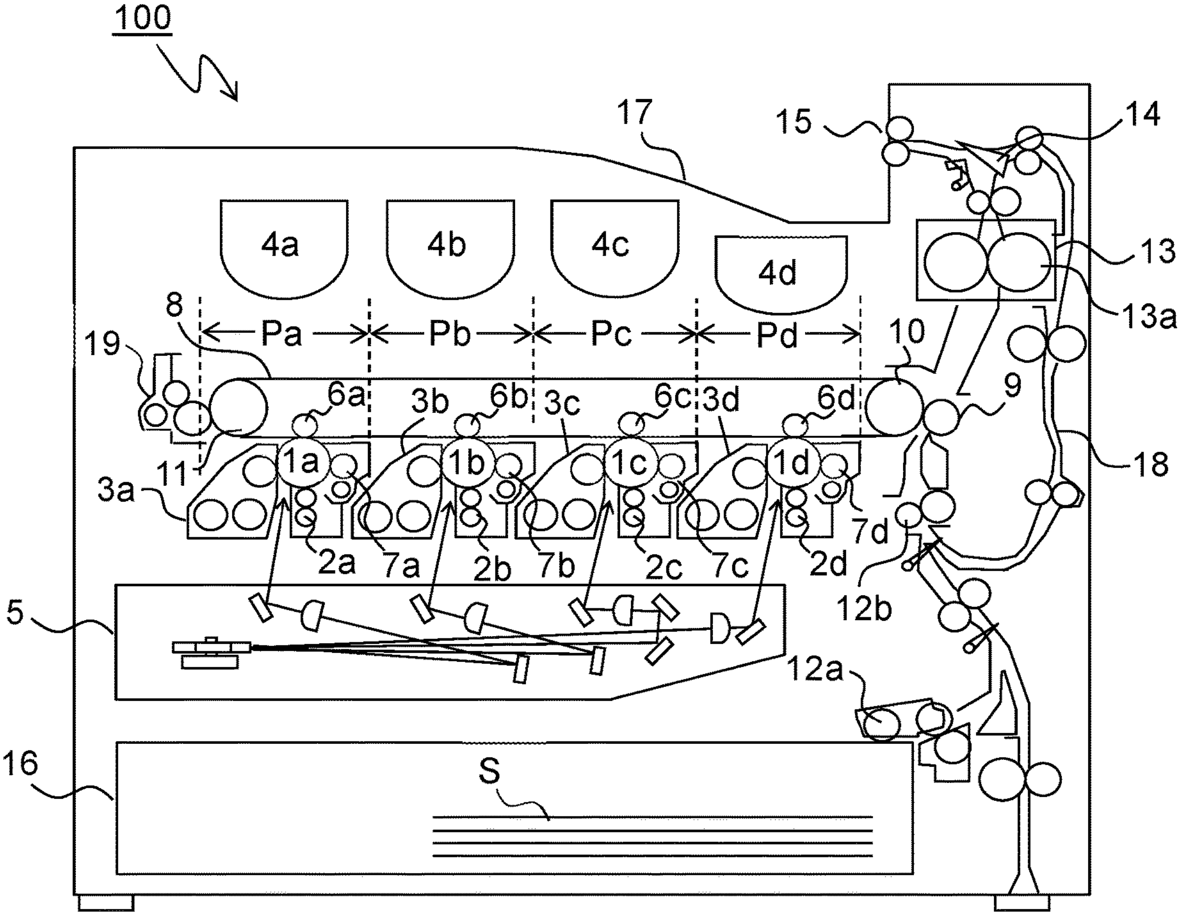
FIG. 1 is a schematic sectional view showing an internal structure of an image forming apparatus according to an embodiment of the present disclosure.

Hereinafter, an embodiment of the present disclosure will be described with reference to the accompanying drawings. FIG. 1 is a schematic sectional view showing an internal structure of an image forming apparatus 100 according to an embodiment of the present disclosure. The image forming apparatus 100 shown in FIG. 1 is what is called a tandem-type color printer, and has a structure as follows. Inside a main body of the image forming apparatus 100, image forming portions Pa, Pb, Pc, and Pd are arranged in this order from an upstream side (an apparatus front side, a left side in FIG. 1) in a conveyance direction. These image forming portions Pa to Pd are disposed corresponding to images of four different colors (magenta, cyan, yellow, and black), and the image forming portions Pa to Pd sequentially form magenta, cyan, yellow, and black images through charging, exposure, developing, and transfer processes.

In these image forming portions Pa to Pd, photosensitive drums 1*a*, 1*b*, 1*c*, and 1*d* are disposed which carry visible images (toner images) of respective colors. Further, adjacent to the image forming portions Pa to Pd, an intermediate transfer belt 8 is disposed which is an endless belt rotatable counterclockwise in FIG. 1. The toner images formed on the photosensitive drums 1*a* to 1*d* are sequentially transferred onto the intermediate transfer belt 8 which moves in contact with the photosensitive drums 1*a* to 1*d*. Thereafter, at a secondary transfer roller 9, the toner images are transferred all at once onto a sheet S as an example of a recording medium. Further, after the toner images are fixed on the sheet S at a fixing portion 13, the sheet S is discharged out of the image forming apparatus 100. While the photosensitive drums 1*a* to 1*d* are being rotated clockwise in FIG. 1, an image forming process is performed with respect to each of the photosensitive drums 1*a* to 1*d*.

Sheets S to which toner images are to be transferred are stored in a sheet cassette 16 arranged in a lower part of the main body of the image forming apparatus 100. Each sheet S is conveyed via a sheet feeding roller 12*a* and a pair of registration rollers 12*b* to the secondary transfer roller 9.

Next, the image forming portions Pa to Pd will be described. Around the photosensitive drums 1*a* to 1*d*, along their rotation direction (clockwise in FIG. 1), charging device 2*a* to 2*d*, developing devices 3*a* to 3*d*, and cleaning devices 7*a* to 7*d* are arranged, and, opposite the photosensitive drums 1*a* to 1*d* with respect to the intermediate transfer belt 8, primary transfer rollers 6*a* to 6*d* are arranged. Further, on an upstream side of the image forming portion Pa with respect to a rotation direction of the intermediate transfer belt 8, a belt cleaning unit 19 is arranged opposite a tension roller 11 with respect to the intermediate transfer belt 8. The belt cleaning unit 19 removes toner left on a surface of the intermediate transfer belt 8.

Next, a description will be given of an image forming procedure in the image forming apparatus 100. When an instruction to start image formation is input by a user, first, the photosensitive drums 1*a* to 1*d* are caused by a main motor (unillustrated) to start rotating, and surfaces of the photosensitive drums 1*a* to 1*d* are uniformly charged by the charging devices 2*a* to 2*d*. Next, the surfaces of the photosensitive drums 1*a* to 1*d* are irradiated with beam light (laser light) emitted from an exposure device 5, and thereby electrostatic latent images are formed on the photosensitive drums 1*a* to 1*d* corresponding to an image signal.

The developing devices 3*a* to 3*d* are each loaded with a predetermined amount of magenta, cyan, yellow, or black toner. When, as a result of toner-image formation described later, the proportion of toner in a two-component developer loaded in each of the developing devices 3*a* to 3*d* has fallen below a prescribed value, toner is replenished from toner containers 4*a* to 4*d* to the developing devices 3*a* to 3*d*. The toner in each of the developers is supplied by the developing devices 3*a* to 3*d* onto the photosensitive drums 1*a* to 1*d*, and electrostatically adheres to the photosensitive drums 1*a* to 1*d*. Thereby, toner images are formed corresponding to the electrostatic latent images formed by the exposure to light from the exposure device 5.

Then, the primary transfer rollers 6*a* to 6*d* generate an electric field with a predetermined transfer voltage between the primary transfer rollers 6*a* to 6*d* and the photosensitive drums 1*a* to 1*d*. Thereby, the magenta, cyan, yellow, and black toner images formed on the photosensitive drums 1*a* to 1*d* are primarily transferred onto the intermediate transfer belt 8. These images of the four different colors are formed in a predetermined positional relationship with each other determined in advance for formation of a predetermined full-color image. Thereafter, in preparation for formation of new electrostatic latent images to be subsequently performed, toner left on the surfaces of the photosensitive drums 1*a* to 1*d* is removed by the cleaning devices 7*a* to 7*d*.

Along with rotation of the driving roller 10 caused by a belt driving motor (unillustrated), the intermediate transfer belt 8 starts to rotate counterclockwise. Then, the sheet S is conveyed from the pair of registration rollers 12*b*, with predetermined timing, to the secondary transfer roller 9 disposed adjacent to the intermediate transfer belt 8, and there a full-color image is transferred onto the sheet S. The sheet S having the transferred toner images thereon is conveyed to the fixing portion 13. Toner left on the surface of the intermediate transfer belt 8 is removed by the belt cleaning unit 19.

The sheet S conveyed to the fixing portion 13 is heated and pressed by a pair of fixing rollers 13*a* to thereby have the toner images fixed to the surface thereof, and the predetermined full-color image is formed. The sheet S having the full-color image formed thereon has a conveying direction thereof switched by a branch portion 14 branching into a plurality of directions, so that the sheet S is discharged as it is (or after being sent into a duplex-printing conveying path 18 and subjected to duplex printing) onto a discharge tray 17 by a pair of discharge rollers 15.

Figure 2:
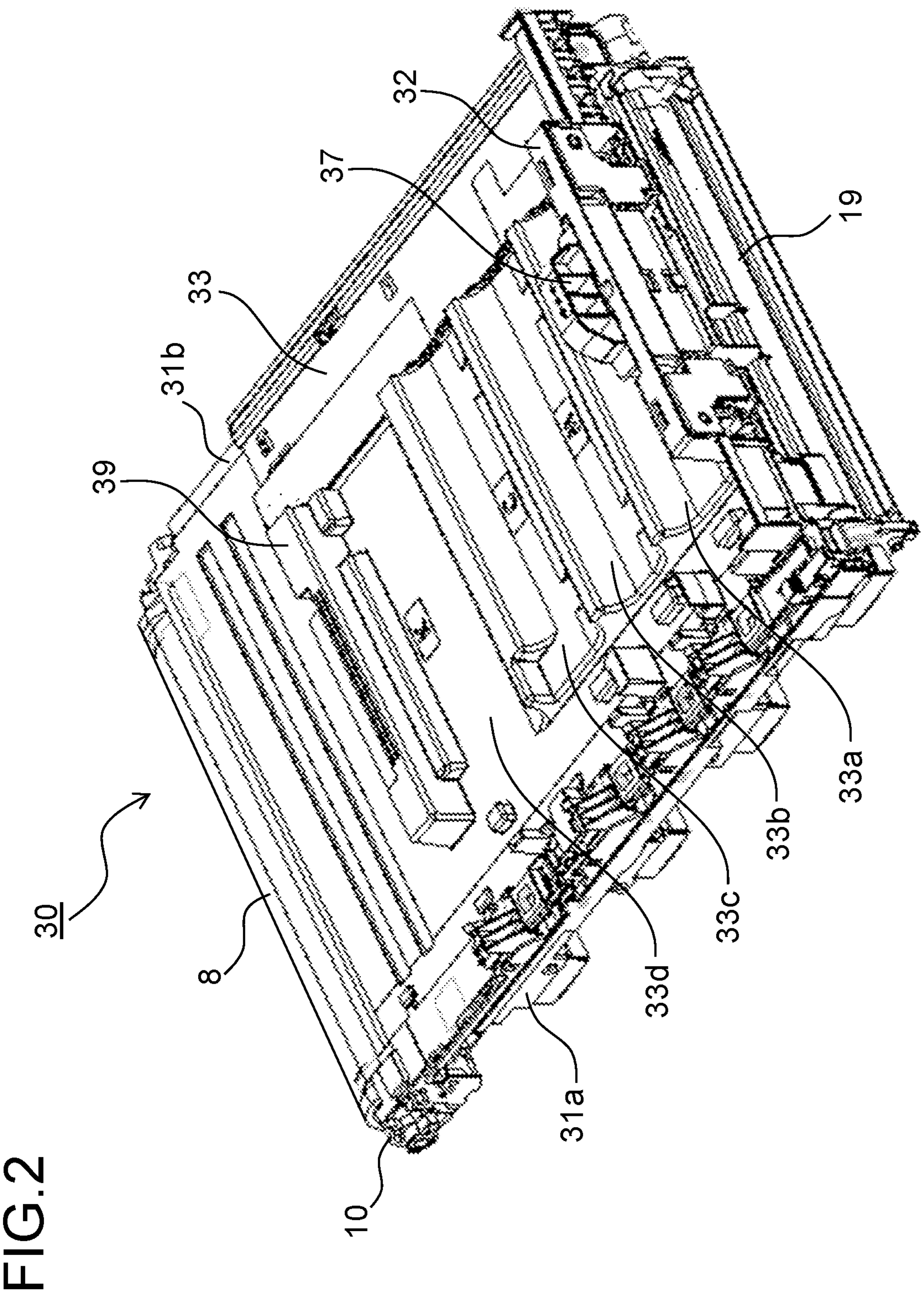
FIG. 2 is an external perspective view of an intermediate transfer unit as seen from a side of a belt cleaning unit.

FIG. 2 is an external perspective view of an intermediate transfer unit 30 as seen from a side of the belt cleaning unit 19. As shown in FIG. 2, the intermediate transfer unit 30 includes a pair of side frames 31*a* and 31*b*, a coupling frame 32, and a top frame 33. The side frames 31*a* and 31*b* rotatably support a plurality of stretching rollers including the primary transfer rollers 6*a* to 6*d*, the driving roller 10, the tension roller 11, and backup rollers 40*a* and 40*b* (see FIG. 3).

The coupling frame 32 is fixed so as to bridge between one end parts (near-right parts in FIG. 2) of the side frames 31*a* and 31*b*. In a top part of the coupling frame 32, a first handle portion 37 is disposed.

The top frame 33 is fixed so as to bridge between top parts of the side frames 31*a* and 31*b*. On the top frame 33, there are disposed container bases 33*a* to 33*d*, on which the toner containers 4*a* to 4*d* (see FIG. 1) are to be mounted, and a second handle portion 39.

Figure 3:
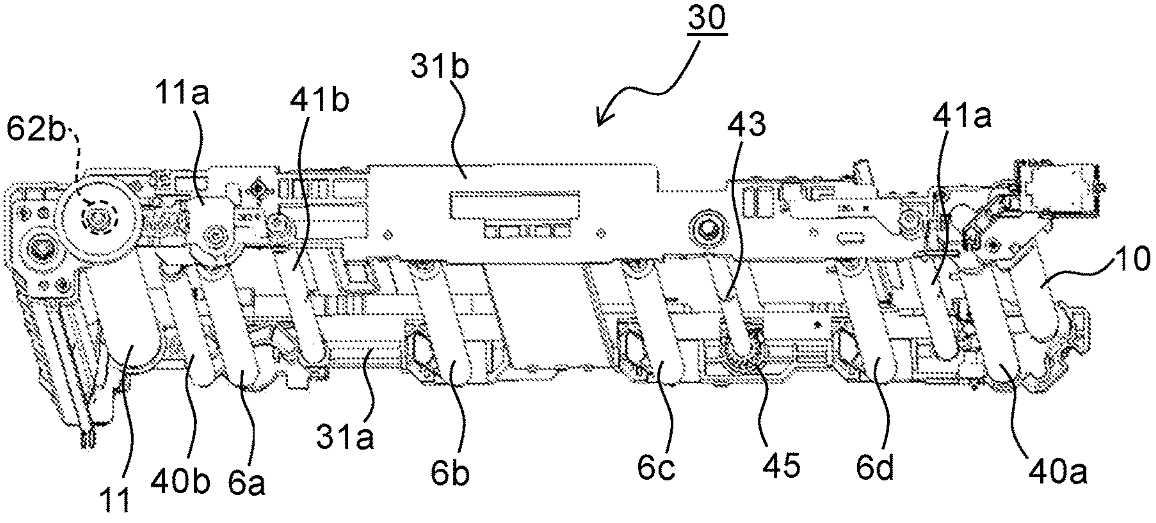
FIG. 3 is a perspective view showing an internal structure of the intermediate transfer unit.

FIG. 3 is a perspective view showing an internal structure of the intermediate transfer unit 30. FIG. 3 illustrates a state where the intermediate transfer belt 8 has been removed to make visible an inside of the intermediate transfer unit 30. On the side frames 31*a* and 31*b* of the intermediate transfer unit 30, the primary transfer rollers 6*a* to 6*d*, the driving roller 10, the tension roller 11, the backup rollers 40*a* and 40*b*, positioning shafts 41*a* and 41*b*, and a driving transmission shaft 43 are supported.

The driving roller 10 is arranged at a downstream-side end part (a right end part in FIG. 3) in a moving direction of a transfer surface (a lower surface) of the intermediate transfer belt 8 (see FIG. 2), and applies a rotational driving force to the intermediate transfer belt 8. The tension roller 11 is arranged at an upstream-side end part (a left end part in FIG. 3) in the moving direction of the transfer surface of the intermediate transfer belt 8 (see FIG. 2), and applies a predetermined tensional force to the intermediate transfer belt 8. Opposite end parts of the tension roller 11 are supported by movable frames 11*a* swingably disposed one on each of the side frames 31*a* and 31*b*.

The backup roller 40*a* is arranged between the primary transfer roller 6*d* and the driving roller 10. The backup roller 40*a* adjusts an angle of the intermediate transfer belt 8 after passing the primary transfer roller 6*d* and an angle of the intermediate transfer belt 8 approaching the driving roller 10. The backup roller 40*b* is arranged between the tension roller 11 and the primary transfer roller 6*a*. The backup roller 40*b* adjusts an angle of the intermediate transfer belt 8 approaching the primary transfer roller 6*a* after passing the tension roller 11.

The positioning shafts 41*a* and 41*b* perform positioning of the side frames 31*a* and 31*b* in an up-down direction and a horizontal direction. Further, the positioning shafts 41*a* and 41*b* project from the side frames 31*a* and 31*b* outward in an axial direction, and performs positioning of the intermediate transfer unit 30 and the main body of the image forming apparatus 100.

Further, for grounding (earthing) of the intermediate transfer unit 30, the positioning shafts 41*a* and 41*b* are brought into contact with a main body frame (unillustrated), with end parts of the positioning shafts 41*a* and 41*b* serving as points of contact. Thus, to prevent the positioning shafts 41*a* and 41*b* from rotating to invite wear-out of the points of contact with the main body frame, the positioning shafts 41*a* and 41*b* are non-rotatably supported by the side frames 31*a* and 31*b*.

To opposite end parts of the driving transmission shaft 43, gears 45 are fixed which mesh with racks 65 (see FIG. 4) disposed on the side frames 31*a* and 31*b*. When the driving transmission shaft 43 is caused by a motor (unillustrated) to rotate forward or backward, via the gears 45 and the racks 65, first bearing arms 61 of the primary transfer rollers 6*a* to 6*d* and second bearing arms 63 of the backup roller 40*b* (see FIG. 4 for all) move in a direction for making contact with or separating from an inner circumferential surface of the intermediate transfer belt 8.

Thereby, the primary transfer rollers 6*a* to 6*d* and the backup roller 40*b* are switched between a state (a contact state) of being pressed against the photosensitive drums 1*a* to 1*d* via the intermediate transfer belt 8 and a state (a separate state) of being separate from the photosensitive drums 1*a* to 1*d*. Specifically, to form a full-color image, the primary transfer rollers 6*a* to 6*d* and the backup roller 40*b* are brought into the contact state. To form a monochrome image, only the primary transfer roller 6*d* corresponding to the image forming portion Pd for black is brought into the contact state, and the primary transfer rollers 6*a* to 6*c* and the backup roller 40*b* are brought into the separate state. Further, to attach or detach the intermediate transfer unit 30, in order to avoid interference between the photosensitive drums 1*a* to 1*d* and the intermediate transfer unit 30, the primary transfer rollers 6*a* to 6*d* and the backup roller 40*b* are brought into the separate state.

Figure 4:
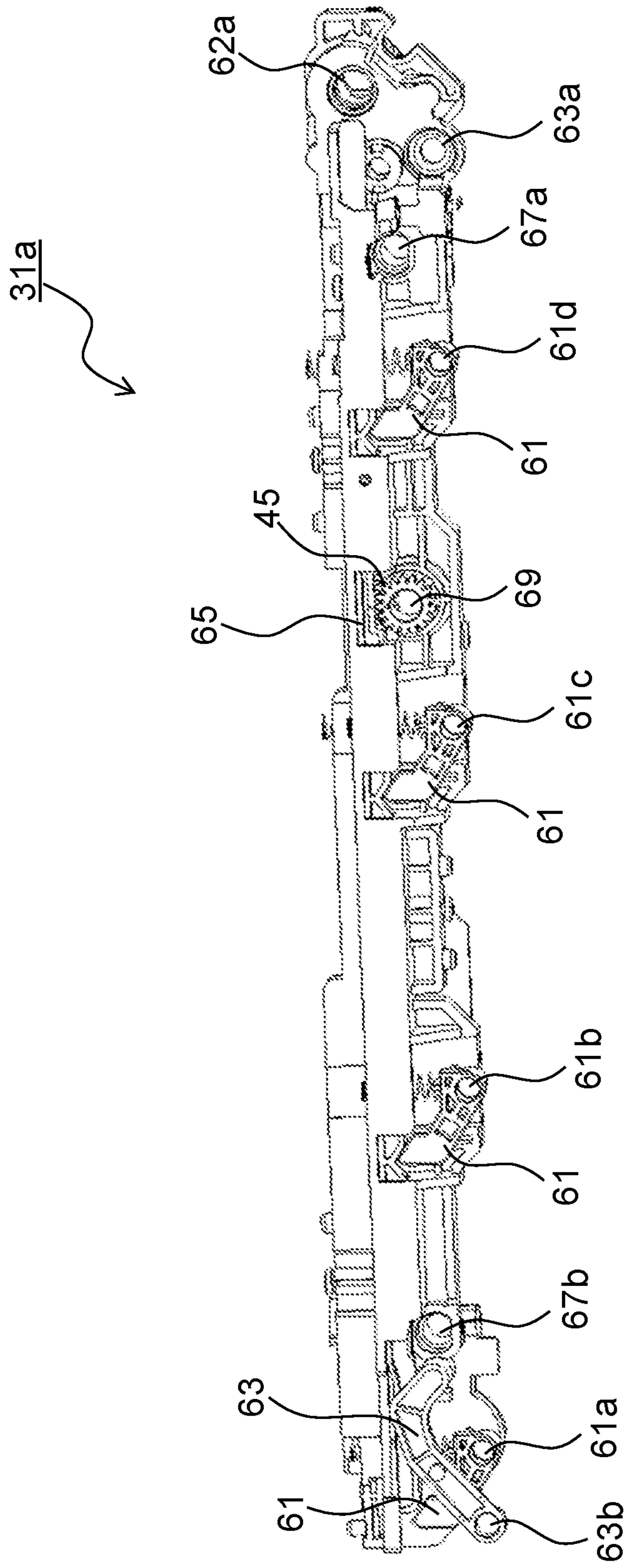
FIG. 4 is a plan view of a side frame of the intermediate transfer unit as seen from inside.

FIG. 4 is a plan view of the side frame 31*a* of the intermediate transfer unit 30 as seen from inside. The side frames 31*a* and 31*b* are basically similar to each other in structure except that they are formed in bilateral symmetry. At four positions in the side frame 31*a*, the first bearing arms 61 are swingably attached which support the primary transfer rollers 6*a* to 6*d*. At swingable ends of the first bearing arms 61, there are formed first bearing holes 61*a* to 61*d* into which opposite end parts of the primary transfer rollers 6*a* to 6*d* are inserted.

In opposite end parts of the side frame 31*a* in a longitudinal direction, there are formed second bearing holes 62*a* and 62*b* which support the driving roller 10 and the tension roller 11, respectively. The second bearing hole 62*b* which supports the tension roller 11 is formed in the movable frame 11*a* (see FIG. 3) that is swingably attached to the side frame 31*a*.

In the vicinity of the opposite end parts of the side frame 31*a* in the longitudinal direction, there are formed third bearing holes 63*a* and 63*b* which support the backup rollers 40*a* and 40*b*, respectively. The third bearing hole 63*b*, which supports the backup roller 40*b*, is formed in a swingable end of the second bearing arm 63 that is swingably attached to the side frame 31*a*.

On an inner surface of the side frame 31*a*, the rack 65 is supported so as to be slidable along the longitudinal direction (a left-right direction in FIG. 4). The rack 65 is in mesh with gear-shaped portions (unillustrated) formed on swing shafts of the first bearing arms 61 and the second bearing arm 63. When the gears 45 fixed to the driving transmission shaft 43 (see FIG. 3) rotate to cause the rack 65 to reciprocate, the first bearing arms 61 and the second bearing arm 63 swing in the up-down direction. Thereby, the primary transfer rollers 6*a* to 6*d* and the backup roller 40*b* are switched between the contact state and the separate state.

In the side frame 31*a*, there are formed first positioning holes 67*a* and 67*b* and a second positioning hole 69. Into the first positioning holes 67*a* and 67*b*, the positioning shafts 41*a* and 41*b* are inserted. Into the second positioning hole 69, the driving transmission shaft 43 is inserted.

Figure 5:
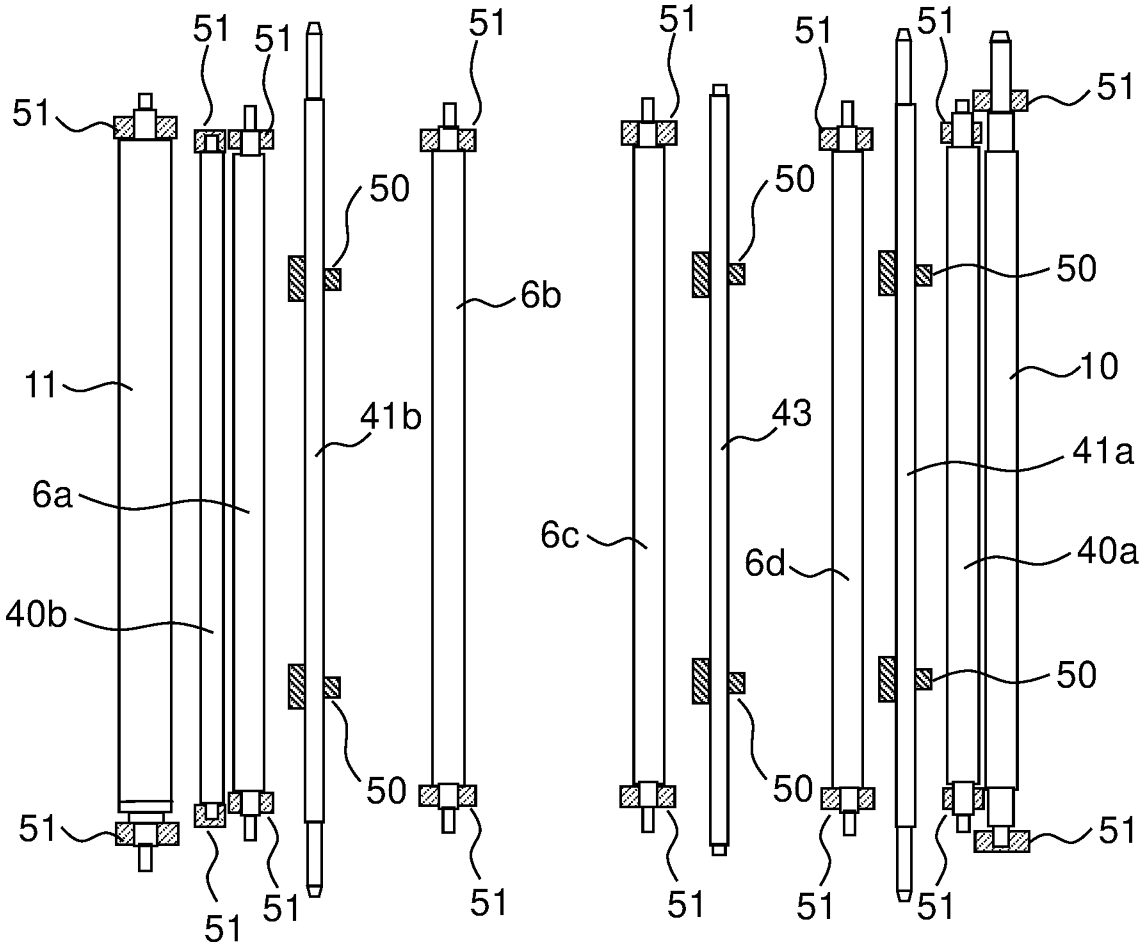
FIG. 5 is a diagram showing, as seen from above, a state in which primary transfer rollers, a driving roller, a tension roller, backup rollers, positioning shafts, and a driving transmission shaft that constitute the intermediate transfer unit are held on first holding jigs and second holding jigs.

Next, a description will be given of a procedure of assembling the intermediate transfer unit 30. In the present embodiment, a robot arm is used to automatically assemble the intermediate transfer unit 30. FIG. 5 is a diagram showing, as seen from above, a state in which the primary transfer rollers 6*a* to 6*d*, the driving roller 10, the tension roller 11, the backup rollers 40*a* and 40*b*, the positioning shafts 41*a* and 41*b*, and the driving transmission shaft 43 are held on first holding jigs 50 and second holding jigs 51.

In assembling the intermediate transfer unit 30, as shown in FIG. 5, the primary transfer rollers 6*a* to 6*d*, the driving roller 10, the tension roller 11, the backup rollers 40*a* and 40*b*, the positioning shafts 41*a* and 41*b*, and the driving transmission shaft 43 (hereinafter may also be referred to as the rollers and the shafts) are held by the first holding jigs 50 and the second holding jigs 51, the first holding jigs 50 and the second holding jigs 51 being arranged at predetermined intervals. Thereby is performed positioning of the rollers and the shafts with respect to the first bearing holes 61*a* to 61*d*, the second bearing holes 62*a* and 62*b*, the third bearing holes 63*a* and 63*b*, the first positioning holes 67*a* and 67*b*, and the second positioning hole 69 (hereinafter may also be referred to as the bearing holes and the positioning holes) formed in each of the side frames 31*a* and 31*b* (a positioning step).

The positioning shafts 41*a* and 41*b* and the driving transmission shaft 43 are held by the first holding jigs 50 at two positions in the axial direction. The primary transfer rollers 6*a* to 6*d*, the driving roller 10, the tension roller 11, and the backup rollers 40*a* and 40*b* are each held by the second holding jigs 51 at two positions (the opposite end parts) in the axial direction.

The rollers and the shafts are arranged at positions shifted from each other in a horizontal direction (a moving direction of the intermediate transfer belt 8, a left-right direction in FIG. 5) so as not to overlap each other in the up-down direction (a direction perpendicular to a plane of a sheet on which FIG. 5 is drawn).

With this arrangement, when the robot arm grips the rollers and the shafts to have them held by the first holding jigs 50 and the second holding jigs 51, it is possible to prevent interference between shafts held by adjacent ones of the first holding jigs 50 and rollers held by adjacent ones of the second holding jigs 51. Further, it is also possible to first have the rollers and the shafts held by such ones of the first holding jigs 50 and the second holding jigs 51 as are located above and then have the rollers and the shafts held also by such ones of the first holding jigs 50 and the second holding jigs 51 as are located below, and this makes it easy to change the arrangement order of the rollers and the shafts.

Figure 6:
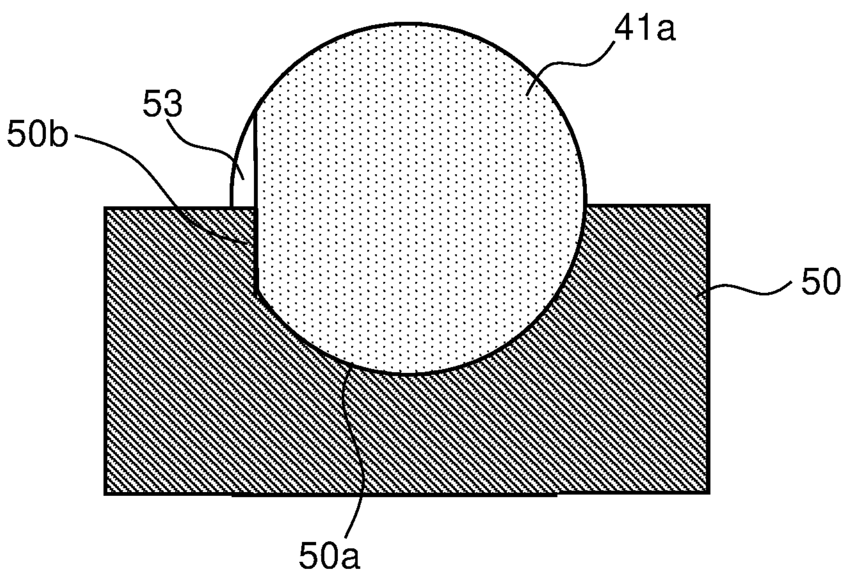
FIG. 6 is a sectional view of an engagement portion of a positioning shaft and a first holding jig as seen in an axial direction.

FIG. 6 is a sectional view of an engagement portion of the positioning shaft 41*a* and one of the first holding jigs 50 as seen in the axial direction. In an outer circumferential surface of the positioning shaft 41*a*, there are formed first engagement grooves 53 at positions opposite the first holding jigs 50. The first engagement grooves 53 are each formed by cutting part of the outer circumferential surface of the positioning shaft 41*a* into a flat surface. That is, of the positioning shaft 41*a*, a section that includes a first engagement groove 53 is D-shaped.

The first holding jigs 50 each have an engagement recess 50*a* in which the positioning shaft 41*a* engages. As seen in the axial direction, the engagement recess 50*a* is arc-shaped and substantially equal in radius to the positioning shaft 41*a*, and at one end part in a circumferential direction thereof, the engagement recess 50*a* has a regulation wall 50*b* which is opposite the first engagement groove 53. With this structure, the positioning shaft 41*a* is engageable in the engagement recesses 50*a* by means only of the first engagement grooves 53.

As shown in FIG. 6, by engaging the first engagement grooves 53, which are formed at two positions in the positioning shaft 41*a*, with the engagement recesses 50*a* of the first holding jigs 51, the positioning shaft 41*a* is horizontally held by the first holding jigs 50 in a state restricted in position in the axial direction and in phase in the circumferential direction, and is arranged opposite the first positioning hole 67*a* (see FIG. 4) corresponding thereto. Note that, the positioning shaft 41*b* and the driving transmission shaft 43 also have similar first engagement grooves 53 formed therein, and are horizontally held by the first holding jigs 50 in a state restricted in position in the axial direction and in phase in the circumferential direction, and are respectively arranged opposite the first positioning hole 67*b* and the second positioning hole 69 (see FIG. 4 for all) corresponding thereto.

Further, with the first engagement grooves 53 formed at two positions that are asymmetric in the axial direction, if the positioning shafts 41*a* and 41*b* and the driving transmission shaft 43 are inverted, the first engagement grooves 53 do not engage with the engagement recesses 50*a*. Thus, it is possible to prevent the positioning shafts 41*a* and 41*b* and the driving transmission shaft 43 from being reversely held by the first holding jigs 51.

Figure 7:
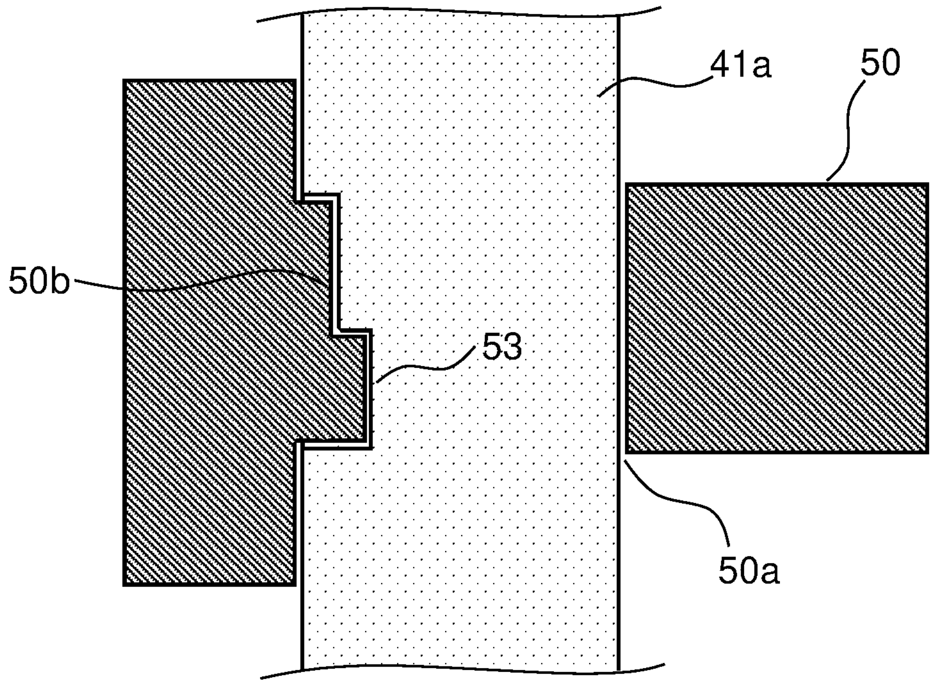
FIG. 7 is a plan view, as seen from above, of an engagement portion of a positioning shaft and a first holding jig of a modified example in which a first engagement groove has a depth of two stages in an axial direction.

Or, as shown in FIG. 7, also by forming the first engagement grooves 53 with different depths to be continuous in the axial direction and also forming the regulation wall 50*b* of the engagement recess 50*a* stepwise corresponding to such first engagement grooves 53, it is possible to prevent reverse arrangement of the positioning shafts 41*a* and 41*b* and the driving transmission shaft 43.

Figure 8:
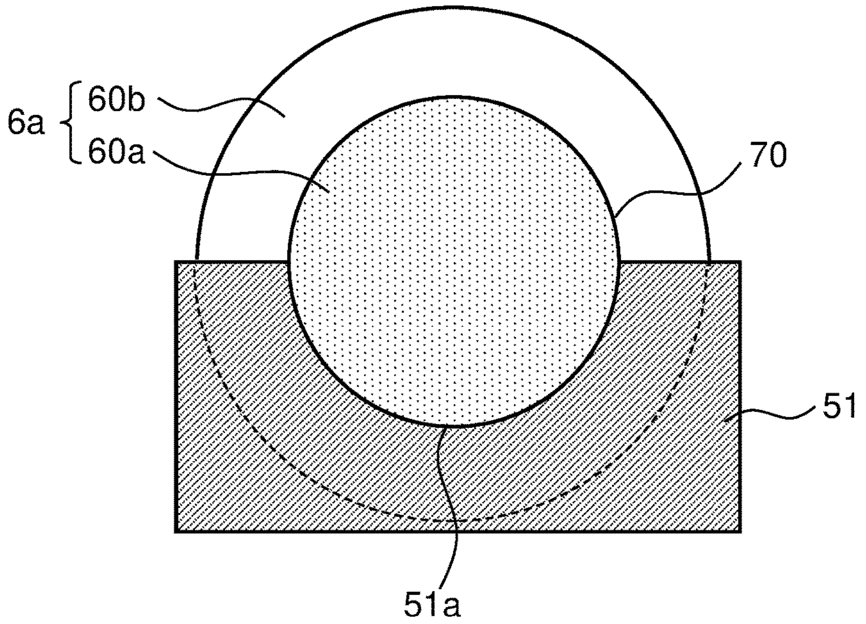
FIG. 8 is a sectional view of an engagement portion of a primary transfer roller and a second holding jig as seen in the axial direction.

FIG. 8 is a sectional view of an engagement portion of the primary transfer roller 6*a* and the second holding jig 51 as seen in the axial direction. The primary transfer roller 6*a* includes a metal core 60*a* and an elastic layer 60*b* that is electrically conductive and laid on an outer circumferential surface of the metal core 60*a*. In each of the opposite end parts of the primary transfer roller 6*a*, a step portion 70 (a second engagement groove) is formed which constitutes a boundary between the metal core 60*a* and the elastic layer 60*b*. The second holding jigs 51 each have an engagement recess 51*a* in which the step portion 70 engages. As seen in the axial direction, the engagement recess 51*a* is arc-shaped and substantially equal in radius to the metal core 60*a*.

As shown in FIG. 8, the step portion 70 of each of the opposite end parts of the primary transfer roller 6*a* is engaged in the engagement recess 51*a*, and thereby the primary transfer roller 6*a* is horizontally held by the second holding jigs 51 with a position thereof in the axial direction restricted, and is arranged opposite the first bearing hole 61*a* (see FIG. 4) corresponding thereto. Note that the primary transfer rollers 6*b* to 6*d*, the driving roller 10, the tension roller 11, and the backup rollers 40*a* and 40*b* also have a similar step portion 70 formed at each of their opposite end parts. Thereby, the primary transfer rollers 6*b* to 6*d*, the driving roller 10, the tension roller 11, and the backup rollers 40*a* and 40*b* are horizontally held by the second holding jigs 51 with positions thereof in the axial direction restricted, and are respectively arranged opposite the first bearing holes 61*b* to 61*d*, the second bearing holes 62*a* and 62*b*, and the third bearing holes 63*a* and 63*b* (see FIGS. 3 and 4 for all) corresponding thereto.

Note that, in the present embodiment, the step portion 70 formed at the boundary between the metal core 60*a* and the elastic layer 60*b* is used as the second engagement groove in which a second holding jig 51 engages, but instead, aside from the step portion 70, a second engagement groove that is annular may be formed in the metal core 60*a*.

Figure 9:
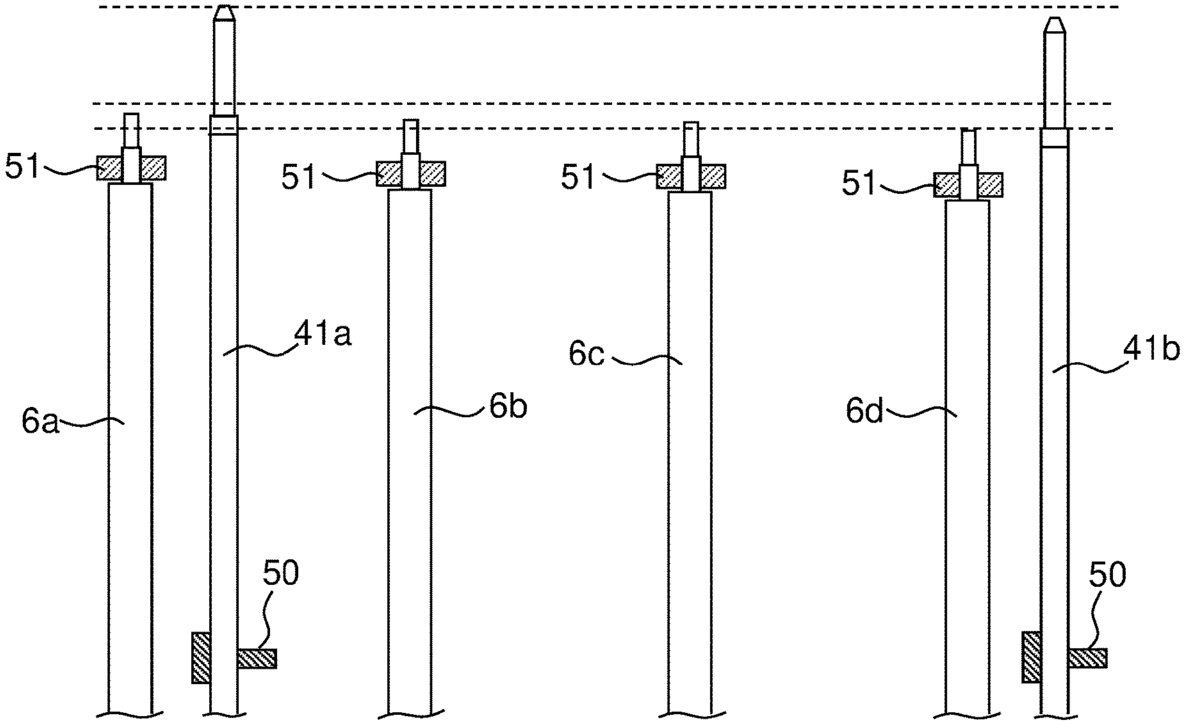
FIG. 9 is an enlarged view of one end side of the primary transfer rollers and the positioning shafts shown in FIG. 5.

FIG. 9 is an enlarged view of one end side (a side of the side frame 31*a*) of the primary transfer rollers 6*a* to 6*d* and the positioning shafts 41*a* and 41*b* shown in FIG. 5. As shown in FIG. 9, the end parts of the positioning shafts 41*a* and 41*b* held by the first holding jigs 50 are arranged at positions shifted from each other in the axial direction. Specifically, the end part of the positioning shaft 41*a* projects outward in the axial direction (upward in FIG. 9) more than that of the positioning shaft 41*b*.

Likewise, the end parts of the primary transfer rollers 6*a* to 6*d* supported by the second holding jigs 51 are arranged at positions shifted from each other in the axial direction. Specifically, the end part of the primary transfer roller 6*a* projects outward in the axial direction (upward in FIG. 9) the most, and amounts of outward projection of the primary transfer rollers 6*b*, 6*c*, and 6*d* in the axial direction are smaller in this order.

Further, although not illustrated in FIG. 9, the backup rollers 40*a* and 40*b* (see FIG. 5) are also arranged at positions shifted from each other in the axial direction. That is, a plurality of rollers or shafts of the same kind (the primary transfer rollers 6*a* to 6*d*, the backup rollers 40*a* and 40*b*, the positioning shafts 41*a* and 41*b*) are arranged at positions shifted from each other in the axial direction.

Next, to the rollers and the shafts held by the first holding jigs 50 or the second holding jigs 51, the side frames 31*a* and 31*b* are attached from outside in the axial direction (a frame attaching step). As mentioned previously, a plurality of rollers or shafts of the same kind are arranged at positions shifted from each other in the axial direction.

Thus, in attaching the side frame 31*a* to the positioning shafts 41*a* and 41*b*, which are supported by the first holding jigs 50, and the primary transfer rollers 6*a* to 6*d* and the backup rollers 40*a* and 40*b*, which are supported by the second holding jigs 51, from outside in the axial direction, the primary transfer rollers 6*a* to 6*d*, the backup rollers 40*a* and 40*b*, and the positioning shafts 41*a* and 41*b* are inserted one by one at different timings into the first bearing holes 61*a* to 61*d*, the third bearing holes 63*a* and 63*b*, and the first positioning holes 67*a* and 67*b* (see FIG. 4 for all) formed in the side frame 31*a*.

Further, the rollers and the shafts of different kinds including the driving roller 10 and the tension roller 11 and the driving transmission shaft 43 are also inserted one by one at different timings into the first bearing holes 61*a* to 61*d*, the second bearing holes 62*a* and 62*b*, the third bearing holes 63*a* and 63*b*, the first positioning holes 67*a* and 67*b*, and the second positioning hole 69 formed in the side frame 31*a*.

For example, in FIG. 5, the positions of the end parts of the primary transfer rollers 6*a* to 6*d* and the backup rollers 40*a* and 40*b* in the axial direction appear to be the same, but the first bearing holes 61*a* to 61*d* and the third bearing holes 63*a* and 63*b* formed in the side frame 31*a* are different from each other in position in the axial direction. Thus, the primary transfer rollers 6*a* to 6*d* are inserted into the first bearing holes 61*a* to 61*d* at timings different from the timings at which the backup rollers 40*a* and 40*b* are inserted into the third bearing holes 63*a* and 63*b*.

Further, FIG. 9 shows a positional relationship between the primary transfer rollers 6*a* to 6*d* and the positioning shafts 41*a* and 41*b* on one side (a side of the side frame 31*a*), and on the other side (a side of the side frame 31*b*), the positional relationship is reverse to the one shown in FIG. 9. That is, on the other side, the end part of the positioning shaft 41*b* projects outward in the axial direction more than the end part of the positioning shaft 41*a*, and amounts of outward projection of the primary transfer rollers 6*d*, 6*c*, 6*b*, and 6*a* in the axial direction are smaller in this order. As a result, on the side frame 31*b*, the primary transfer rollers 6*a* to 6*d* and the positioning shafts 41*a* and 41*b* are inserted into the first bearing holes 61*a* to 61*d* and the first positioning holes 67*a* and 67*b* in an order reverse to the order on the side frame 31*a*.

Likewise, the rollers and the shafts of different kinds including the driving roller 10 and the tension roller 11 and the driving transmission shaft 43 are also inserted into the first bearing holes 61*a* to 61*d*, the second bearing holes 62*a* and 62*b*, the third bearing holes 63*a* and 63*b*, the first positioning holes 67*a* and 67*b*, and the second positioning hole 69 formed in the side frame 31*b* in an order reverse to the order on the side frame 31*a*.

Thereby, in attaching the side frames 31*a* and 31*b* from outside in the axial direction, the rollers and the shafts are inserted in order one by one into the bearing holes and the positioning holes formed in the side frames 31*a* and 31*b*. The side frames 31*a* and 31*b* may be attached one by one starting from one side or the other side of the rollers and the shafts, or may be attached simultaneously on one side and the other side.

With the side frames 31*a* and 31*b* attached thereto, the rollers and the shafts are in a temporarily held state in which they are inserted midway into the bearing holes and the positioning holes.

Next, the first holding jigs 50 are separated downward from the positioning shafts 41*a* and 41*b* and the driving transmission shaft 43. Further, the second holding jigs 51 are separated downward from the driving roller 10, the tension roller 11, the primary transfer rollers 6*a* to 6*d*, and the backup rollers 40*a* and 40*b* (a separating step). Then, the side frames 31*a* and 31*b* are further moved inward in the axial direction, and thereby a state is achieved in which the rollers and the shafts are fully inserted in the bearing holes and the positioning holes.

Thereafter, the intermediate transfer belt 8, the coupling frame 32, the top frame 33, the belt cleaning unit 19, etc. (see FIG. 2 for all) are attached, and the assembling of the intermediate transfer unit 30 is completed. In attaching the intermediate transfer belt 8, the movable frames 11*a* (see FIG. 3) supporting the tension roller 11 are caused to swing with respect to the side frames 31*a* and 31*b*, and thereby the tension roller 11 is caused to move in a direction for approaching the backup roller 40*b*. Then, after stretching the intermediate transfer belt 8 around the rollers, the movable frames 11*a* are moved back to their original positions, and in this manner, the intermediate transfer belt 8 can be attached easily.

According to the structure described above, there is no possibility that the timings of insertion of the rollers and the shafts into the bearing holes and the positioning holes formed in the side frames 31*a* and 31*b* will overlap with each other, which helps suppress occurrence of poor insertion. Accordingly, it is possible to achieve a smooth operation of assembling the intermediate transfer unit 30 by means of a robot arm.

Further, as to the positioning shafts 41*a* and 41*b* and the driving transmission shaft 43, which need to be in phase with each other in the circumferential direction at the time of insertion into the side frames 31*a* and 31*b*, the engagement of the first engagement grooves 53, which are formed in the positioning shafts 41*a* and 41*b* and the driving transmission shaft 43, with the first holding jigs 50 simultaneously regulates their positions in the axial direction and their phases in the circumferential direction. Accordingly, there is no need for an operation of matching their phases in the circumferential direction, and automatic assembly by means of a robot arm can be easily performed.

The embodiment described above is in no way meant to limit the present disclosure, which thus allows for many modifications and variations within the spirit of the present disclosure. For example, in the above embodiment, as the stretching rollers around which to stretch the intermediate transfer belt 8, the primary transfer rollers 6*a* to 6*d*, the driving roller 10, the tension roller 11, and the backup rollers 40*a* and 40*b* are used, but another roller in addition to these rollers may be included in the stretching rollers, or part of the above rollers (for example, the backup roller 40*b*) may be omitted.

Further, in the above embodiment, as the shafts constituting the intermediate transfer unit 30, the positioning shafts 41*a* and 41*b* and the driving transmission shaft 43 are used, but another shaft in addition to these shafts may be included in the shafts, or part of the shafts (for example the positioning shaft 41*b*) may be omitted.

Further, the application of the present disclosure is not limited to the tandem color printer as shown in FIG. 1, but the present disclosure is applicable to various types of image forming apparatuses, such as color copiers, digital multifunction peripherals, facsimile machines, and laser printers that are provided with the intermediate transfer unit 30 that is attached and detached to and from the main body of the image forming apparatus 100. Further, the application of the present disclosure is not limited to the intermediate transfer unit 30, but the present disclosure is also completely similarly applicable to a conveyance unit that conveys a recording medium by means of a conveyance belt stretched around a plurality of rollers.

The present disclosure is usable in a belt unit attached in a main body of an image forming apparatus, and is also usable in a method for assembling a belt unit. The use of the present disclosure makes it possible to provide a belt unit and a method for assembling a belt unit that contribute to improved workability in automatic assembly by means of a robot arm.

What is claimed is:

1. A belt unit, comprising:

a belt that is endless;

a plurality of stretching rollers that are arranged in contact with an inner circumferential surface of the belt;

a pair of side frames that rotatably support opposite end parts of the stretching rollers in an axial direction thereof; and one or more shafts of which opposite end parts in an axial direction thereof are non-rotatably supported by the side frames, the belt unit being attachable and detachable with respect to a main body of an image forming apparatus, wherein the pair of side frames are each provided with bearing holes that rotatably support the opposite end parts of the plurality of stretching rollers and positioning holes into which the opposite end parts of the shafts are inserted;

the shafts each have formed therein a first engagement groove that engages with a first holding jig that horizontally holds that shaft during assembly of the belt unit;

the plurality of stretching rollers each have formed therein a second engagement groove that engages with a second holding jig that horizontally holds that stretching roller during assembly of the belt unit;

when the first engagement groove is in engagement with the first holding jig, the shafts are arranged opposite the positioning holes corresponding thereto, and have a phase thereof restricted in a circumferential direction thereof; and when the second engagement groove is in engagement with the second holding jig, the stretching rollers are arranged opposite the bearing holes corresponding thereto.

2. The belt unit according to claim 1, wherein the first engagement groove is formed by cutting part of an outer circumferential surface of a corresponding one of the shafts into a flat surface such that a section of that shaft that includes the first engagement groove is D-shaped.

3. The belt unit according to claim 2, wherein the shafts each have formed therein the first engagement groove at each of two positions asymmetric in the axial direction.

4. The belt unit according to claim 2, wherein the shafts each have formed therein the first engagement groove of which a depth from the outer circumferential surface thereof varies in the axial direction thereof.

5. The belt unit according to claim 1, wherein the stretching rollers each include a metal core and an elastic layer laid on an outer circumferential surface of the metal core, and the second engagement groove is a step portion formed at a boundary between the metal core and the elastic layer.

6. The belt unit according to claim 1, wherein the shafts include a positioning shaft of which opposite end parts in the axial direction thereof project outward beyond the side frames and that performs positioning of the belt unit with respect to the main body of the image forming apparatus.

7. The belt unit according to claim 1, wherein the shafts and the stretching rollers are arranged at positions shifted from each other in a moving direction of the belt so as not to overlap each other in an up-down direction.

8. The belt unit according to claim 1, wherein the belt unit is an intermediate transfer unit, the intermediate transfer unit comprising:

as the belt, an intermediate transfer belt on which toner images formed on image carriers are sequentially laid one on another; and as the stretching rollers, a driving roller that is arranged in contact with an inner circumferential surface of the intermediate transfer belt and that drives the intermediate transfer belt to rotate, a tension roller that rotates following the intermediate transfer belt and that applies a predetermined tensional force to the intermediate transfer belt, a plurality of primary transfer rollers that are pressed against the image carriers via the intermediate transfer belt, and backup rollers that are arranged between the driving roller and the primary transfer rollers and between the tension roller and the primary transfer rollers.

9. A method for assembling a belt unit, the belt unit including a belt that is endless, a plurality of stretching rollers that are arranged in contact with an inner circumferential surface of the belt, a pair of side frames that rotatably support opposite end parts of the stretching rollers in an axial direction thereof, and one or more shafts of which opposite end parts in an axial direction thereof are non-rotatably supported by the pair of side frames, the belt unit being attachable and detachable with respect to a main body of an image forming apparatus, wherein the pair of side frames are each provided with bearing holes that rotatably support the opposite end parts of the plurality of stretching rollers and positioning holes into which the opposite end parts of the shafts are inserted;

the shafts each have formed therein a first engagement groove that engages with a first holding jig that horizontally holds that shaft; and the plurality of stretching rollers each have formed therein a second engagement groove that engages with a second holding jig that horizontally holds that stretching roller during assembly of the belt unit, the method comprising:

a positioning step of engaging the first engagement groove of that shaft with the first holding jig to arrange the shafts opposite the positioning holes corresponding thereto and restrict a phase of the shafts in a circumferential direction thereof, and engaging the second engagement groove of that stretching roller with the second holding jig to arrange the stretching rollers opposite the bearing holes corresponding thereto;

a frame attaching step of attaching the side frames from outside in the axial direction of the shafts held by the first holding jig and the plurality of stretching rollers held by the second holding jig; and a separating step of separating the first holding jig and the second holding jig from the shafts and the plurality of stretching rollers, wherein in the positioning step, when held by the first holding jig or the second holding jig, the end parts of the shafts and the plurality of stretching rollers are arranged at positions different from each other in the axial direction thereof; and in the frame attaching step, the shafts and the plurality of stretching rollers are inserted into the positioning holes and the bearing holes at different timings.

* * * * *